Patented July 4, 1933

1,916,779

UNITED STATES PATENT OFFICE

BRUNO WENDT, OF DESSAU IN ANHALT, AND HANS BINCER, OF DESSAU-ZIEBIGK, GERMANY, ASSIGNORS TO AGFA ANSCO CORPORATION, OF BINGHAMTON, NEW YORK, A CORPORATION OF NEW YORK

LIGHT-SENSITIVE MATERIAL

No Drawing. Application filed May 9, 1930, Serial No. 451,192, and in Germany May 14, 1929.

Our invention relates to an improvement in the manufacture of light-sensitive materials used in the so-called "bleaching-out" process and more particularly to fixable layers useful for this process.

As binding agents for the preparation of bleaching-out layers, to be a carrier for the light-sensitive dye, only gelatin or nitrocellulose has, heretofore, been used. Hitherto there has not been known any practically satisfactory process of fixing the layers consisting of such binding agents or of any other cellulose derivatives, and this for want of a solvent for the usual sensitizers of the class of the thiosinamines in which the binding agent is capable of swelling while the dyestuffs are insoluble. When, in order to render possible the fixation, a binding agent is selected which, as for instance a cellulose ether, has the property of swelling in a liquid that does not dissolve the dyestuffs but dissolves the sensitizers, the production of practically useful layers fail because the dyestuffs are precipitated when drying the layers, so that subsequently pictures of a dirty aspect are obtained.

According to the present invention, these drawbacks are avoided by using as a binding agent for the bleaching-out dyes a mixture of materials which together have the desired properties. For this purpose, materials capable of retaining the dye in a state of true solution are mixed with other materials practically incapable of dissolving the dye, these second materials being capable of swelling in the solvent used in each particular case as fixing agent by removing the sensitizer. The binding agent will generally consist of a mixture of one representative of each of the above two groups of substances. In this manner binding agents are obtained which maintain the dyes in perfect solution even when the layers are dried and which, on the other hand, permit of dissolving the sensitizer after the exposure to light without the colors being detrimentally affected.

As materials which are capable of swelling in the fixing agent, (as for instance in benzene, other aromatic hydrocarbons, benzine and ethers, such as ethyl ether which do not dissolve the dyestuffs) cellulose ethers and ether-esters, such as cellulose ethyl benzyl ether, cellulose ethyl butyl ether, cellulose propyl ether, are, among others, especially suitable, while the other part of the mixture forming the binding agent and dissolving the dyes, may consist, among others, of alcohols of high boiling point such as, for instance, monoacetin, glycol chlorhydrine and the homologues thereof, of a softening agent, such as phthalic acid dimethyl ester, methyl cyclohexanol or, preferably, of a cellulose ester as, for instance, nitrocellulose, cellulose acetate, cellulose acetate nitrate or the like.

The following examples illustrate the invention, the parts being by weight:—

*Example 1.*—70 parts of cellulose ethyl benzyl ether and 30 parts of nitrocellulose are dissolved in an organic solvent common to both cellulose derivatives, and to the mixture a basic dye is added. From this mixture a photographic layer is formed and sensitized by means of diethylthiosinamine. This layer exposed under an original to the action of light, may be fixed by means of a mixture of benzine and anisol in the proportion 3:1.

The basic dyestuffs used in the bleaching-out processes are well known in the art. We enumerate, for instance, Flavindulin (Schultz, Farbstofftabellen, 6th edition, No. 668, Berlin), Rosindulin 2 B (Farbstofftabellen No. 673), Capriblue G O N (Farbstofftabellen No. 620), Methyleneblue (Farbstofftabellen No. 659), Naphthol Blue R (Farbstofftabellen No. 649), Pyronin G (Farbstofftabellen No. 568).

*Example 2.*—A layer which may be fixed in the same manner as described in Example 1, may be prepared from a mixture of 50 parts of nitrocellulose and 50 parts of cellulose ethyl butyl ether.

*Example 3.*—A layer which may be fixed by a treatment with ether, is obtainable by preparing it under the conditions given in Example 1, from 70 parts of cellulose nitrate acetate and 30 parts of cellulose propyl ether.

Our invention is not limited to the foregoing examples or to the specific details given therein. Thus, for instance, we may use instead of diethylthiosinamine another sensitizer, such as allylthiourea or its derivatives substituted by aryl groups. As a fixing agent we may use other solvents or mixture of solvents dissolving the sensitizer being, however, non-solvents for the dyes contained in the layers and acting upon the other constituents of the layer only as a swelling agent. The best manner of proceeding may be found in every case by a simple experiment, care being taken only, to maintain the conditions broadly described above.

What we claim is:—

1. A photographic layer for the bleaching-out process comprising bleaching-out dyes and a sensitizer for said dyes, both substances uniformly distributed throughout a mixture of at least two binding agents one of which dissolves said dyes while the other is capable of swelling in the fixing agent.

2. A photographic layer for the bleaching-out process comprising bleaching-out dyes and a sensitizer for said dyes, both substances uniformly distributed throughout a mixture of cellulose ethyl benzyl ether and nitrocellulose.

3. A photographic layer for the bleaching-out process comprising bleaching-out dyes and a sensitizer for said dyes, both substances uniformly distributed throughout a mixture of cellulose ethyl butyl ether and nitrocellulose.

4. A photographic layer for the bleaching-out process comprising bleaching-out dyes and a sensitizer for said dyes, both substances uniformly distributed throughout a mixture of cellulose propyl ether and cellulose nitrate acetate.

5. A photographic layer for the bleaching-out process comprising bleaching-out dyes and a sensitizer for said dyes, both substances uniformly distributed throughout a mixture of a compound selected from the group consisting of high boiling alcohols and cellulose esters with at least one compound selected from the group consisting of cellulose ethers and ether-esters.

6. A photographic layer for the bleaching-out process comprising bleaching-out dyes and a sensitizer for said dyes, both substances uniformly distributed throughout a mixture of a compound selected from the group consisting of high boiling alcohols and cellulose esters with at least one compound selected from the group consisting of cellulose ethers and ether-esters and a softening agent.

In testimony whereof, we affix our signatures.

BRUNO WENDT.
HANS BINCER.